Figure 1:
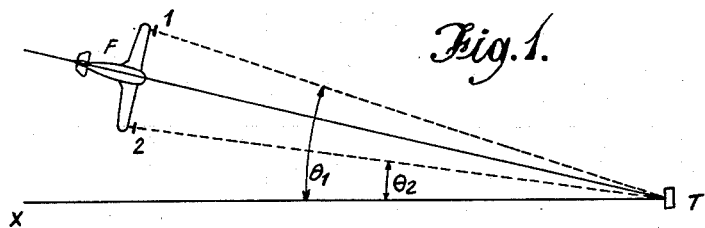

Aug. 22, 1950  D. WEIGHTON  2,519,521

RADIO GUIDING AND LANDING SYSTEM

Filed Nov. 26, 1948

ANGULAR DEVIATION OF RECEIVING AERIAL

Inventor
DONALD WEIGHTON
By Emery Holcombe+Blair
Attorneys

Patented Aug. 22, 1950

2,519,521

UNITED STATES PATENT OFFICE 2,519,521

RADIO GUIDING AND LANDING SYSTEM

Donald Weighton, Cambridge, England, assignor to Pye Limited, Cambridge, England, a British company Application November 26, 1948, Serial No. 61,961
In Great Britain November 29, 1947

6 Claims. (Cl. 343—109)

This invention relates to radio guiding and landing systems more particularly, but not exclusively, for aircraft.

In a known method of assisting aircraft to land in conditions of bad visibility by radio signals, three separate transmitting and receiving equipments are required to provide respectively track guidance in azimuth, track guidance in elevation, and an indication of distance from a selected point on the airfield.

The present invention relates to a method and means for measuring distance with a transmitter and receiver for track guidance, the system being made to serve both purposes (viz., track guidance and distance measurement) with only minor modifications and additions to the receiver in the aircraft and with no change in the ground transmitter. The necessity for separate distance measuring equipment is thus avoided and the complexity of the landing system considerably reduced.

In a conventional system of azimuth track guidance, the ground transmitter is modulated with two low frequency tones and connected to an aerial in such a manner as to radiate different directional patterns for the two modulating frequencies. Thus the signal received at any point to the right of some predetermined course line is modulated mainly with one tone, and the signal received to the left of this line is modulated mainly with the other tone. The modulation depths of the two tones are equal when the receiver is located on the course line and an aircraft is enabled to follow this line in approach to an airfield by comparison of the amplitudes of the two tones produced at the detector of a receiver in the aircraft. The ratio of the depths of modulation of the two tones increases uniformly from some very small value at a small angle (usually about 4 degrees) on one side of the course line, through unity on the course line to some very large value at an equal angle on the other side of the course line.

According to the invention, two similar receiving aerials are mounted on the craft in spaced relation symmetrically to the axis of the craft, and provision is made in the receiver (or receivers) on the craft for measuring the sum and the difference of the differences in the depths of modulation between the two tones modulating the signals derived from the two aerials. The sum of the differences in depth of modulation indicates the deviation of the centre of the craft from the course line, and the difference between the differences in depth of modulation indicates the distance from the transmitter in terms of the separation of the aerials and the course sharpness of the system, both of which are known.

Figure 2:
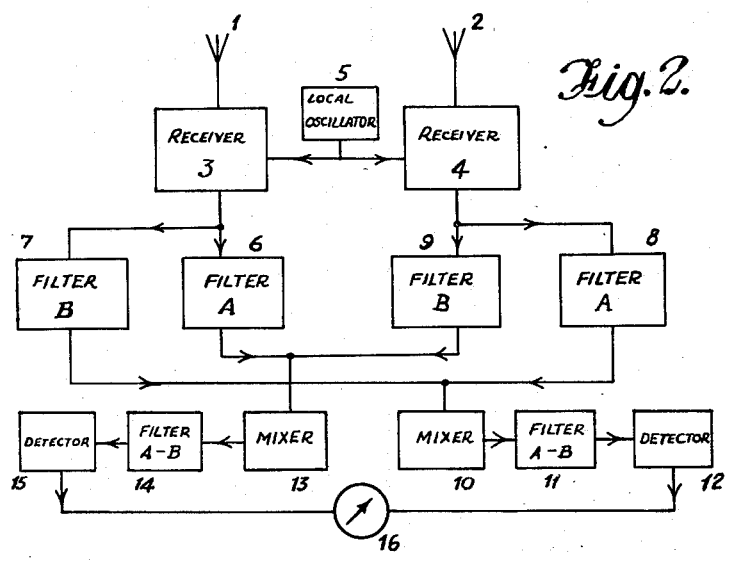
Figure 3:
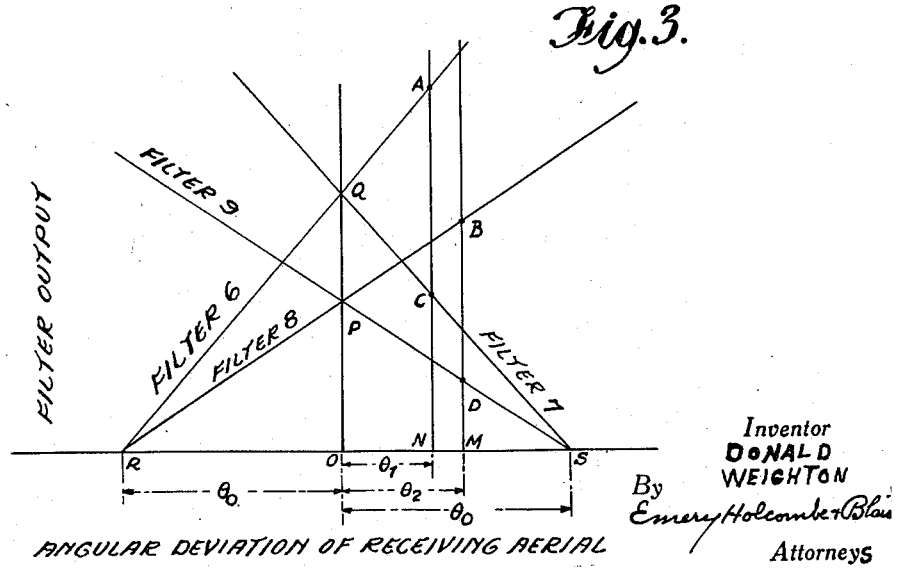

The invention will be more clearly understood from the accompanying drawing, in which Fig. 1 is a diagram for explaining the principle of the invention, Fig. 2 shows a schematic circuit diagram of one form of receiving apparatus, Fig. 3 is a graph for explaining the invention.

Figure 1 diagrammatically shows a plan view of an aircraft F approaching an airfield provided with an azimuth track guidance transmitter T, the aircraft being provided with two similar receiving aerials 1 and 2 mounted in horizontally spaced relation symmetrically to the axis of the aircraft, preferably on the wing tips of the aircraft. The difference in the depths of modulation of the two tones received at aerial 1, defines the angle $\theta_1$ between the line T-1 and the line T-X representing the equi-signal course, and the difference in depth of modulation of the two tones received at aerial 2 defines the angle $\theta_2$ between the line T-2 and the line T-X, since the relation between the difference in depth of modulation and the angle of deviation from the course line is linear for small angles, is fixed by the aerial system of the transmitter T, and is generally standardised at ⅔ of the total modulation depth for one degree deviation off course. The difference between the differences in depth of modulation of the two tones received at aerials 1 and 2 is then proportional to the angle $\theta_1-\theta_2$ (Figure 1), and hence is inversely proportional to the distance of the aircraft F from the transmitter T. A meter provided in the aircraft and reading this difference may then be calibrated directly in miles from the transmitter, or preferably from some point on the course line at which the aircraft should touch down.

Errors may be introduced if the axis of the aircraft is not aligned with the direction of approach since the effective horizontal spacing of the aerials 1 and 2 is reduced. The errors will however be very small for all altitudes of the aircraft likely to occur in approach. Thus it may be shown that an error of only 1% in distance is introduced for an inclination of the axis of 8 degrees to the line of approach.

A more serious error may arise if there is no provision for balancing the signals from the two aerials and their associated receivers, since the inequality of signal amplitude from these two sources will generally be larger than the difference in tone ratios which it is desired to measure.

A feature of the invention, therefore, consists in the provision of means for avoiding this error, and one embodiment of receiving apparatus incorporating means for this purpose will now be described with reference to Figures 2 and 3. In Figure 2 the aerials 1 and 2 are respectively connected to two receivers 3 and 4 which may have a common local oscillator 5. The demodulated outputs from the two receivers are fed to similar pairs of filters 6 and 7, and 8 and 9, respectively. The filters 6 and 8 select one tone denoted by frequency A, and the filters 7 and 9 select the other tone denoted by frequency B. The outputs from filters 7 and 8 are combined in a mixer 10, in which a tone of the difference frequency A–B is produced. This is selected by the filter 11, from the output of which a direct current is produced in the detector 12 proportional to the amplitude of this difference frequency component. In a similar manner, the outputs from filters 6 and 9 are combined in a mixer 13 to produce a tone of the difference frequency A–B which is selected by the filter 14, and a direct current proportional to this difference frequency component is derived in the detector 15. The difference between the outputs from the detectors 12 and 15 is indicated in the meter 16.

In the graph shown in Figure 3, the angular positions of the receiving aerials 1 and 2 shown in Figure 1, and represented by the angles (such as $\theta_1$ and $\theta_2$) between the course line T–X and the lines (such as T–1 and T–2) joining the transmitter T to the aerials, are plotted horizontally as abscissae from the origin O. The amplitudes of the signal tones A and B produced by the receivers 3 and 4 at the outputs of the appropriate filters 6, 7, 8 and 9, are plotted as vertical ordinates. As the receiver 3 is moved across the course line T–X from one side to the other, the output from one filter 6 will increase from zero at a point R (angular deviation $\theta_0$) in a linear manner as represented by the line RQA. At the same time, the output from the other filter 7 will decrease linearly as represented by the line QS, to zero at the point S (angular deviation $\theta_0$). When the receiver is on the course line T–X, the two signal outputs from the filters 6 and 7 will be equal, as shown by the intersection of the lines RQA and SQ at the point Q on the ordinate passing through the origin O.

The receiver 4 will have similar characteristics, except that since its gain is assumed to be different from that of receiver 3, the slopes of the lines RPB and SP representing the output voltages of its filters 8 and 9 respectively will be different from those appertaining to the receiver 3. This is shown in Figure 3 by giving each of the lines RPB and SP a slope different from that of the corresponding lines RQA and SQ appertaining to the receiver 3, it being assumed for the purpose of illustration in Figure 3, that the gain of the receiver 4 is less than that of receiver 3.

When the aircraft F is in the position shown in Figure 1, in which the angular deviations of the aerials 1 and 2 from the course line T–X are $\theta_1$ and $\theta_2$ respectively, the amplitudes of the signal outputs from the filters 6 and 7 of the receiver 3 will be given in the graph of Figure 3 respectively by the ordinates AN and CN for the abscissa $\theta_1$, and similarly the amplitudes of the signal outputs from the filters 8 and 9 of the receiver 4 will be given respectively by the ordinates BM and DM for the abscissa $\theta_2$. By similar triangles, $$AN = OQ\left(\frac{\theta_0 + \theta_1}{\theta_0}\right)$$

$$CN = OQ\left(\frac{\theta_0 - \theta_1}{\theta_0}\right)$$

$$BM = OP\left(\frac{\theta_0 + \theta_2}{\theta_0}\right)$$

$$DM = OP\left(\frac{\theta_0 - \theta_2}{\theta_0}\right)$$

The output from the filter 11 is proportional to the product of the outputs from filters 7 and 8:

$$CN \times BM = OP.OQ\left(\frac{\theta_0 - \theta_1}{\theta_0}\right)\left(\frac{\theta_0 + \theta_2}{\theta_0}\right)$$

$$CN \times BM = \frac{OP.OQ}{\theta_0^2}[\theta_0^2 - \theta_0(\theta_1 - \theta_2) - \theta_1\theta_2]$$

Similarly the output from filter 14

$$AN \times DM = \frac{OP.OQ}{\theta_0^2}[\theta_0^2 + \theta_0(\theta_1 - \theta_2) - \theta_1\theta_2]$$

The difference measured by the meter 16 is, therefore $$AN.DM - CN.BM = 2\frac{OP.OQ}{\theta_0}(\theta_1 - \theta_2)$$

This expression does not contain the difference OP–OQ and therefore the reading is not dependent upon small differences in gain of the two aerials and receivers. The actual amplitudes OP and OQ may be held sufficiently constant for the requirements of the distance meter by the automatic gain control of the receivers.

Whereas for the purposes of illustration and explanation of the invention, there has been specifically described a system for track guidance in azimuth which, in accordance with the invention, is made to serve also for distance measurement, the invention is in no way limited to such a system but may equally well be applied in a similar manner to any similar system such as one for providing track guidance in elevation. In that case, the two aerials in the aircraft would be mounted vertically one above the other in spaced relation, instead of one on each wing tip as described. The invention is also not restricted to guiding and landing systems for aircraft, but is applicable, in exactly analogous manner to that described, to any analogous marine transmitter/receiver system providing ship-to-shore track guidance.

I claim:

1. In a radio system for guiding craft by modulating a transmitter with two low frequency tones and radiating different directional patterns for the two modulating frequencies, the combination on the craft of two similar receiving aerials mounted in spaced relation symmetrically to the axis of the craft, receiving means for detecting the signals received from said transmitter by said aerials and including means for detecting the difference in depth of modulation of the two tones received at one of said aerials, means for detecting the difference in depth of modulation of the two tones received at the other of said aerials, and means for measuring the difference of said differences to indicate the distance of the craft from the transmitter.

2. In a radio system for track guidance of craft by modulating a transmitter with two low frequency tones and radiating different directional patterns for the two modulating frequencies, the combination on the craft of two similar receiving aerials mounted in spaced relation symmetrically to the axis of the craft, receiving means for detecting the signals received from said transmitter by said aerials and including means for detecting the difference in depth of modulation of the two tones received at one of said aerials, means for detecting the difference in depth of modulation of the two tones received at the other of said aerials, means for measuring the sum of said differences to indicate the deviation of the craft with respect to a predetermined course line, and means for measuring the difference of said differences to indicate the distance of the craft from the transmitter.

3. In a radio system for guiding craft by modulating a transmitter with two low frequency tones and radiating different directional patterns for the two modulating frequencies, the combination on the craft of two similar receiving aerials mounted in spaced relation symmetrically to the axis of the craft, receiving means for detecting the signals received from said transmitter by said aerials and including means for balancing said signals, means for detecting the difference in depth of modulation of the two tones received at one of said aerials, means for detecting the difference in depth of modulation of the two tones received at the other of said aerials, and means for measuring the difference of said differences to indicate the distance of the craft from the transmitter.

4. In a radio system for track guidance of craft by modulating a transmitter with two low frequency tones and radiating different directional patterns for the two modulating frequencies, the combination on the craft of two similar receiving aerials mounted in spaced relation symmetrically to the axis of the craft, receiving means for detecting the signals received from said transmitter by said aerials and including means for balancing said signals, means for detecting the difference in depth of modulation of the two tones received at one of said aerials, means for detecting the difference in depth of modulation of the two tones received at the other of said aerials, means for measuring the sum of said differences to indicate the deviation of the craft with respect to a predetermined course line, and means for measuring the difference of said differences to indicate the distance of the craft from the transmitter.

5. In a radio system for guiding craft by modulating a transmitter with two low frequency tones and radiating different directional patterns for the two modulating frequencies, the combination on the craft of two similar receiving aerials mounted in spaced relation symmetrically to the axis of the craft, a pair of receivers connected to said aerials respectively, two similar pairs of filters for receiving the outputs from said receivers respectively, one filter of each pair selecting one of said tones and the other filter of each pair selecting the other of said tones, means to combine the outputs of the filter of one pair selecting one tone and the filter of the other pair selecting the other tone and to derive from the combined outputs a tone of the difference frequency, means similarly to combine the outputs of the remaining two filters of said pairs and to derive from the combined outputs a tone of the difference frequency, means to derive respectively from said two difference frequency tones currents proportional respectively to the amplitudes of said difference frequency tones, and an instrument for measuring the difference between said currents.

6. In the art of guiding craft by modulating a radio transmitter with two low frequency tones, radiating different directional patterns for the two modulating frequencies, receiving the radiation at two points separated in space on the craft and comparing the amplitudes of the two received tones by measuring the sum of the differences in depths of modulation between the two tones modulating the signals received at said points to derive an indication of the deviation of the craft with reference to a predetermined course line, the improvement which consists in measuring also the difference of said differences whereby additionally to derive an indication of the distance of the craft from said transmitter.

DONALD WEIGHTON.

REFERENCES CITED

The following references are of record in the file of this patent:

UNITED STATES PATENTS

| Number | Name | Date |
| --- | --- | --- |
| 2,264,063 | Bond | Nov. 25, 1941 |